US012804336B2

(12) United States Patent
Ungaro et al.

(10) Patent No.: US 12,804,336 B2
(45) Date of Patent: Nov. 17, 2026

(54) METHOD FOR INTERCONNECTING A WEARABLE APPLIANCE TO A REMOTE ADJUSTING SOFTWARE VIA A COMMUNICATION NETWORK

(71) Applicant: AMPLIFON S.P.A., Milan (IT)

(72) Inventors: Luigi Ungaro, Milan (IT); Antonio Curci, Milan (IT); Gianna Lardaro, Milan (IT)

(73) Assignee: AMPLIFON S.P.A., Milan (IT)

( * ) Notice: Subject to any disclaimer, the term of this patent is extended or adjusted under 35 U.S.C. 154(b) by 130 days.

(21) Appl. No.: 18/850,259

(22) PCT Filed: Mar. 27, 2023

(86) PCT No.: PCT/IB2023/053010

§ 371 (c)(1),
(2) Date: Sep. 24, 2024

(87) PCT Pub. No.: WO2023/187606

PCT Pub. Date: Oct. 5, 2023

(65) Prior Publication Data

US 2025/0220366 A1 Jul. 3, 2025

(30) Foreign Application Priority Data

Mar. 28, 2022 (IT) ........................ 102022000006065

(51) Int. Cl.
*H04R 25/00* (2006.01)

(52) U.S. Cl.
CPC ......... *H04R 25/558* (2013.01); *H04R 25/554* (2013.01)

(58) Field of Classification Search
CPC ................ H04R 25/558; H04R 25/554; H04R 2225/55; H04W 72/02
See application file for complete search history.

(56) References Cited

U.S. PATENT DOCUMENTS 8,542,842 B2 * 9/2013 Zaccaria ................ H04R 25/70 381/60
9,613,028 B2 * 4/2017 Foo ........................ H04R 25/50
(Continued)

FOREIGN PATENT DOCUMENTS

WO 2016078710 A1 5/2016
WO 2017028876 A1 2/2017
WO WO-2022030733 A1 * 2/2022 ............ H04W 72/02

OTHER PUBLICATIONS

International Search Report for PCT/IB2023/053010, mailed Jul. 24, 2023, 3 pages.

(Continued)

*Primary Examiner* — Angelica M McKinney
(74) *Attorney, Agent, or Firm* — NIXON & VANDERHYE

(57) ABSTRACT

The present invention relates to a method for interconnecting a user's wearable appliance to an adjusting software via a communication network the purpose of which is to enable synchronous fitting of a wearable appliance via the presence of a specific client module and a specific server module both configured to establish a non-hierarchical connection between the computer where the fitting software is installed and a portable device available to the user, and activate at least one transceiver module of the portable device in order to interface the latter with the device worn by the user via a predefined communication protocol made available by the portable device itself.

12 Claims, 6 Drawing Sheets

(56) References Cited

U.S. PATENT DOCUMENTS

| | | | | |
|---|---|---|---|---|
| 2011/0235835 | A1 * | 9/2011 | Bulow | H04R 25/70 381/314 |
| 2018/0310104 | A1 * | 10/2018 | Westergaard | H04R 25/558 |
| 2021/0377674 | A1 | 12/2021 | Klemmensen | |

OTHER PUBLICATIONS

Written Opinion of the ISA for PCT/IB2023/053010, mailed Jul. 24, 2023, 6 pages.

* cited by examiner

METHOD FOR INTERCONNECTING A WEARABLE APPLIANCE TO A REMOTE ADJUSTING SOFTWARE VIA A COMMUNICATION NETWORK

This application is the U.S. national phase of International Application No. PCT/IB2023/053010 filed Mar. 27, 2023, which designated the U.S. and claims priority to IT Patent Application No. 102022000006065 filed Mar. 28, 2022, the entire contents of each of which are hereby incorporated by reference.

TECHNICAL FIELD

The present invention relates to a method for interconnecting a wearable appliance to a remote adjusting software via a communication network.

The present invention has a preferred, but not exclusive, application in the field of adjusting portable hearing aids supplied to patients with hearing dysfunctions.

BACKGROUND ART

In recent years, hearing aid manufacturers have begun, with increasing frequency, to make wireless communication standards available to enable open connections with hearing aids worn by patients.

Such connections can occur mainly in two ways.

With reference to FIG. 1, a first known type of connection with a patient's hearing aid A is possible if the latter installs a specific app B of the manufacturer in his or her smartphone C so that the latter can have access, following a conventional Bluetooth-like pairing, to some configuration parameters, but in a limited manner regulated by international standards.

A second known type of connection is made via specific software (so-called "fitting software"), usually installed in the computers of the hearing care professionals/operators used in the service centers, to enable more comprehensive and in-depth adjustments. In this context, the connection between the hearing care professional's computer and the hearing aid can be made directly in the service center (so-called "in-store fitting") or remotely (so-called "remote fitting").

It should first be specified that each hearing aid manufacturer releases its own proprietary software capable of interfacing only with its own hearing aids placed on the market. This means that service centers must have as many software installed on their computers as there are hearing aids used by their clients introducing enormous complications due to the fact that hearing care professionals are forced to master different platforms and different workflows all different from each other.

Referring to FIG. 2, in the case of "in-store" fittings, since often not all hearing aid professionals' computers are up-to-date with the latest available wireless technology, manufacturers have introduced dedicated hardware devices D which operate as a bridge between the computer E and the hearing aid A in order to establish stable wireless connections with always up-to-date technology. In detail, the bridging device is connected to the computer via standard USB-type wiring F, while the hearing aid A is connected to the bridging device via an interface based, e.g., on the Bluetooth Low Energy (BLE) standard. This means that the bridging device D exposes the fitting software G to the BLE interface so that the latter can communicate with the hearing aid A as if the hearing aid A were directly connected to the fitting software G. The shortcomings of such a solution are many. First of all, the presence of a bridging device is always mandatory which introduces, in effect, a closed ecosystem by forcing hearing care professionals to bind themselves to the technical and procedural guidelines of numerous different manufacturers. Furthermore, any upgrades or introductions of new wireless standards cannot be implemented on such devices until a new bridging device is designed, manufactured and provided to operators to replace the previous one. Additionally, the bridging device must necessarily be installed on the computer via USB wiring: this connection introduces multiple problems during installations or upgrades due to changes in computer drivers and/or periodic updates in operating systems. Finally, operators are forced to connect and disconnect the correct device each time in order to program hearing aids from different manufacturers: this causes confusion and enormous operational problems. Connections based on bridging devices also pose the classic problems associated with any physical product: obsolescence and failures. In such unfortunate cases, hearing care professionals cannot make fittings until the device is replaced or repaired, with very negative effects on the quality of service provided to clients.

Referring to FIG. 3, in the case of remote fittings instead, e.g., those where the patient is unable to go to the service center, the hearing care professional uses the fitting software G to establish a video call with the patient: the latter must use his or her smart-phone C which operates as a bridge. Of course, prior to the video call, the patient must have already installed the specific manufacturer's app so that the fitting software G may connect via Bluetooth to the hearing aid A to then adjust the parameters thereof. The limitations of such a connection method are mainly related to the type of technology used that prevent sufficiently fast connections in order to adjust the parameters of the hearing aid without affecting the proper functioning thereof. For example, the interruption of a connection during a fitting could even have the consequence of functional blocks of the hearing aids. It should also be specified that some parameters must be sent within a certain time limit that, if not met, is ignored by the hearing aid itself. Again, therefore, the implementation and usability issues are different. One of the main problems is that the operator has to identify in advance, remotely, the manufacturer of the hearing aid used by the patient and then select the appropriate fitting software to start the remote fitting session: each fitting software has its own specific procedures for establishing communications and, on the patient side, mobile applications are also very different from each other. Therefore, it is necessary to start video calls in advance to start communication sessions with patients before the actual fitting. Furthermore, having different dedicated video call systems affects the list of features available for communication: the video call system is in fact generally integrated in the fitting software but different for each manufacturer.

It should also be emphasized, therefore, that specific remote fitting processes which are so different among manufacturers result in enormous negative consequences on the patient and on the daily work of the hearing care professional.

In addition to the various remote fitting processes, there is also a further major limitation in the actual fitting workflows: hearing aid manufacturers, in fact, recognizing the limitation of their technologies have implemented separate and dedicated workflows that exclude several key and important features from what can be fitted directly in authorized centers. In other words, remote fitting functions are of such limited scope that it is reflected in extremely low utilization by hearing care professionals who are thus unable to exploit the true potential thereof.

From an IT-technical point of view, remote fitting via smart-phone is mainly carried out according to two techniques:

- first technique: the fitting software generates an adjustment instruction that is sent, via specific servers (e.g., synchronously), to the manufacturer's app installed in the smart-phone and transferred therefrom to the Bluetooth module (also of the smart-phone) to be subsequently processed and sent to the hearing aid.
- second technique: the fitting software generates an instruction, of a more generalized type, which is received by the manufacturer's app installed in the smart-phone. The app thus processes the specific adjustment instructions and locally creates in the smart-phone the Bluetooth module activation instructions needed to interface with the hearing aid in order to adjust it.

It should also be emphasized that current remote solutions are based on server-centric systems with old communication standards (such as, e.g., of the websocket type) that are ill-suited to connection and fitting needs whose write and response times between fitting software and hearing aids are crucial: any delay in the transfer of adjustment instructions can cause problems in the setting of hearing aids that in most cases can only be fixed by a complete restart of the fitting process. The overall performance is therefore limited not only by the performance of the server, the connection bandwidth and the protocol used, but also by the location of the patient and the hearing care professional relative to the server itself, features that otherwise do not affect other applications where timing is not essential. Therefore, for the aforementioned reasons, the overall service is very limited as a result of the issues outlined above, which effectively prevent the provision of a minimally adequate service. To overcome such delays, one option is to install multiple servers in well-defined geographic locations so as to increase their number based on the actual demand. Conversely, however, this prevents immediate scalability: it requires continuous monitoring (to check whether demand exceeds supply) and manual intervention resulting in unsatisfactory response times. Remote fittings are therefore highly dependent on the type and number of servers available, but not only that: delays introduced by apps in smart-phones as well as processing times to process instructions to be sent to hearing aids and vice versa, from the latter to the fitting software, must also be taken into account.

DESCRIPTION OF THE INVENTION

The Applicant, faced with the plurality of existing communication technologies, all of which must coexist at the same time, and with the variety of problems outlined above, has therefore come up with a solution that would first and foremost allow to free itself from the use of bridging devices and also allow the fitting software of different manufacturers to be able to communicate with any of the portable devices provided to patients with hearing dysfunctions by taking advantage of the different communication protocols offered by the portable device itself.

Thus, the Applicant has developed a method for interconnecting a user's wearable appliance to an adjusting software via a communication network the purpose of which is to enable synchronous fitting of the wearable appliance via the presence of a specific client module and a specific server module both configured to:

- establish a non-hierarchical connection between the computer where the fitting software is installed and a portable device available to the user, and
- activate at least one transceiver module of the portable device in order to interface the latter with the device worn by the user via a predefined communication protocol made available by the portable device itself.

A further object of the present invention is to enable the fitting software to communicate directly with the transceiver module of the user's portable device and thus be able to establish direct logical connections with all hearing aids found within the network of the portable device.

Another object of the present invention lies in the ability given to manufacturers of wearable appliances to be able to run in their specific fitting software one and only one predetermined library regardless of the model of wearable appliance and/or the type of fitting software: the library distributed among manufacturers is thus the same. This approach simplifies any further development of these libraries and reduces the maintenance or update effort as operating systems evolve over time.

Still a further object of the present invention is to enable both "in-store" and remote fittings without the use of dedicated bridging devices but by simply taking advantage of communication protocols made available by patients' portable devices.

The aforementioned objects are achieved by the present method for interconnecting a wearable appliance to adjusting software via a communication network having the characteristics of claim 1.

BRIEF DESCRIPTION OF THE DRAWINGS

Other characteristics and advantages of the present invention will become more apparent from the description of some preferred, but not exclusive, embodiments of a method for interconnecting a hearing aid to an adjusting software, illustrated by way of an indicative, yet non-limiting example, in the accompanying tables of drawings in which:

FIGS. 3 and 4 are schematic figures of the architecture in accordance with the present invention;

EMBODIMENTS OF THE INVENTION

Figure 1:
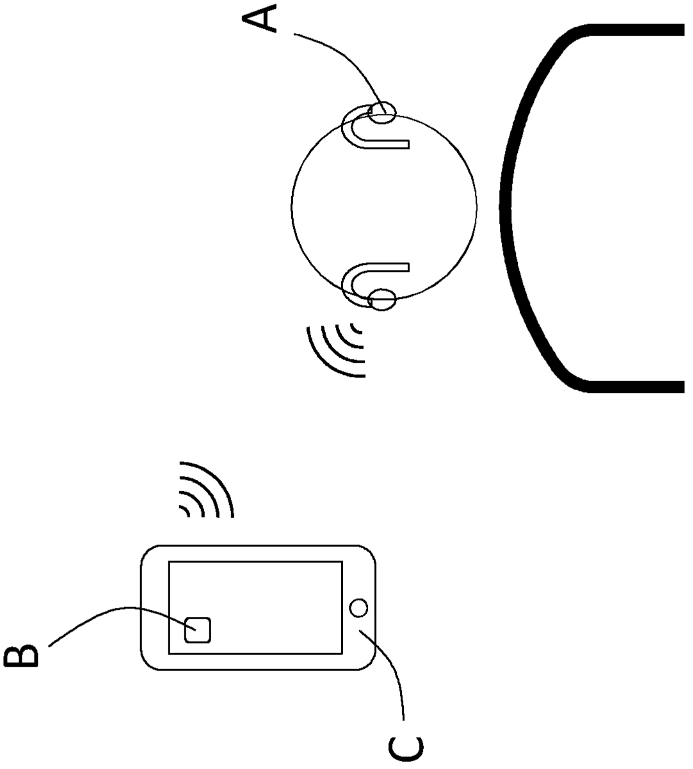
Fig.1 (PRIOR ART)
FIGS. 1 through 3 are schematic views of known types of connections between a user's wearable appliance and an adjusting software.
Figure 2:
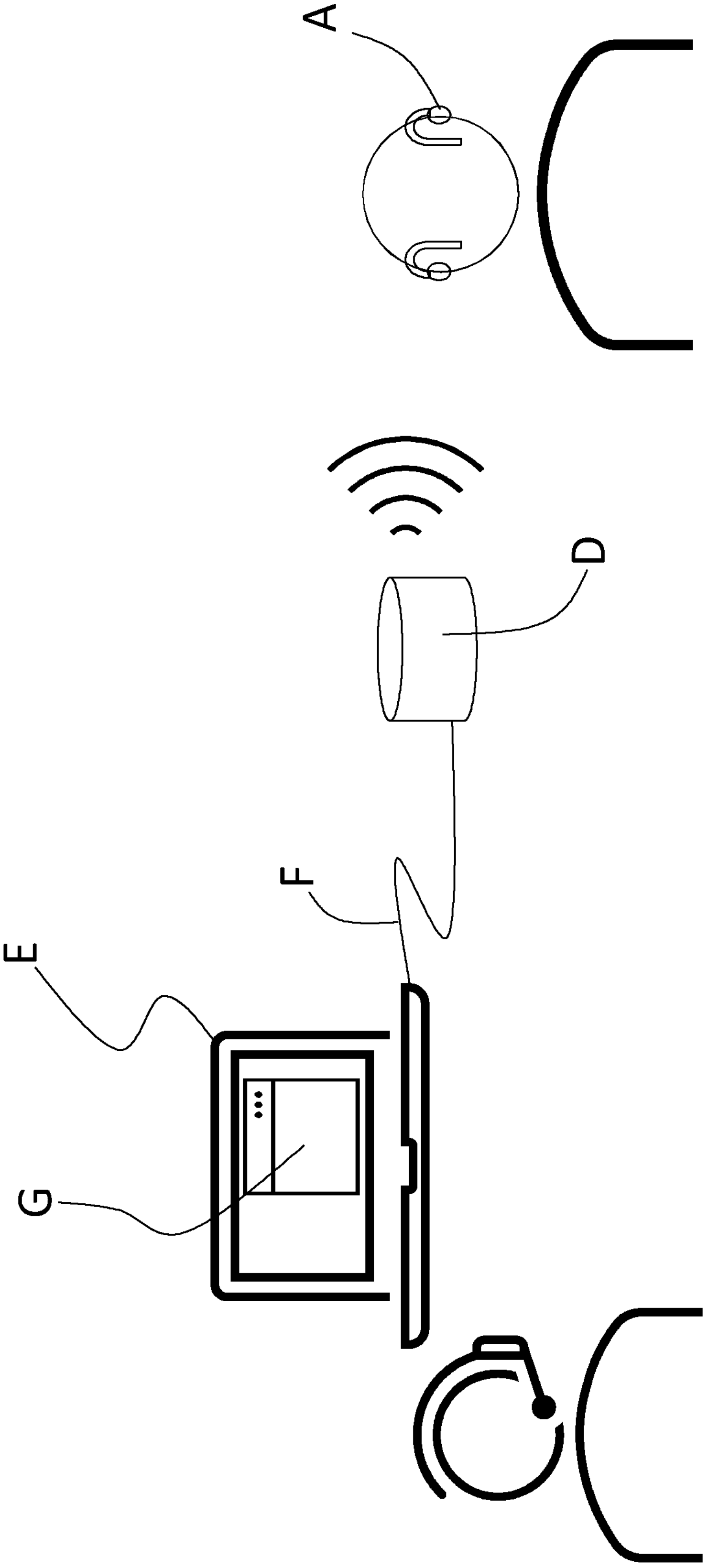
Fig.2 (PRIOR ART)
Figure 3:
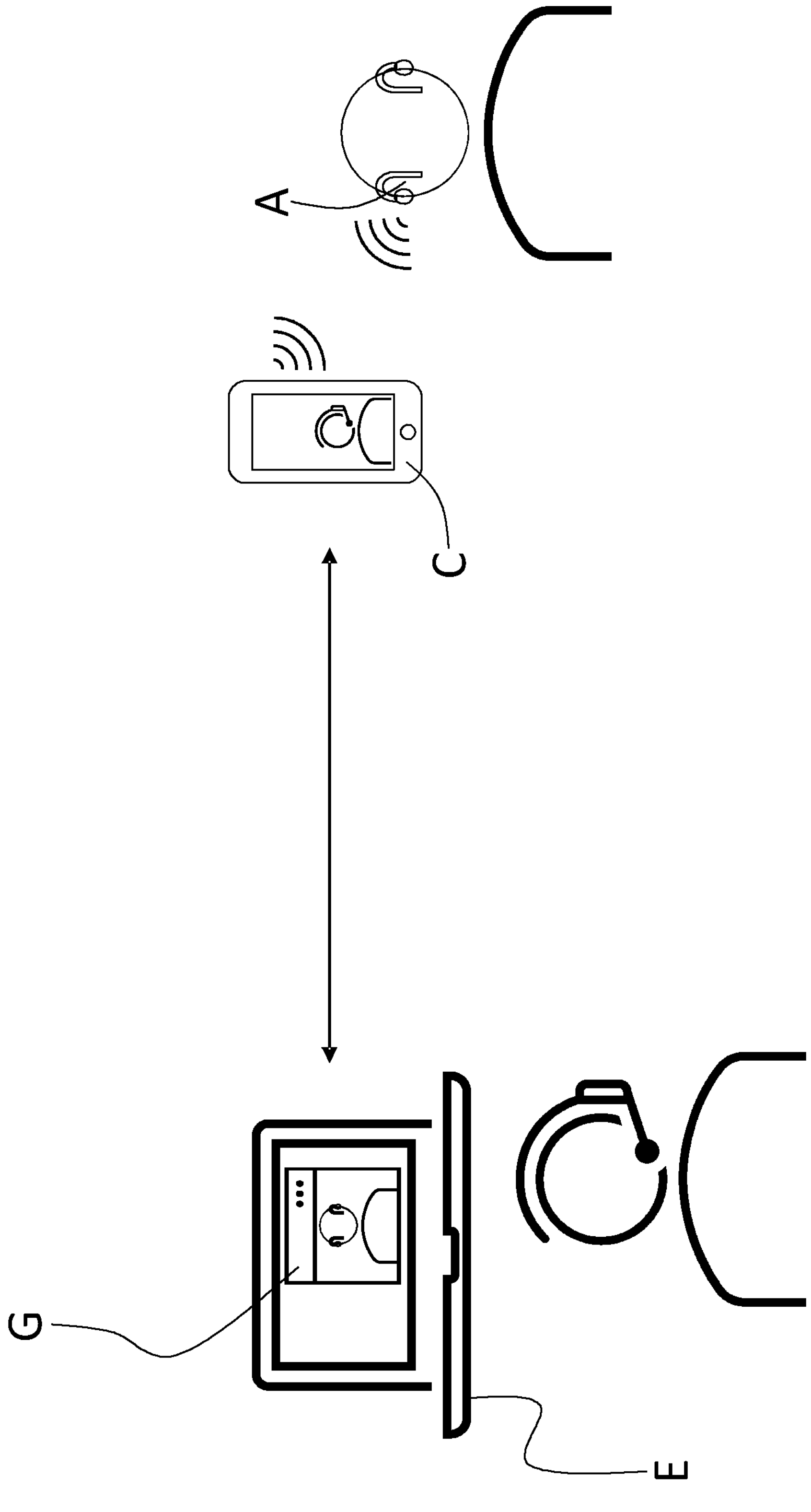
Fig.3 (PRIOR ART)
Figure 4:
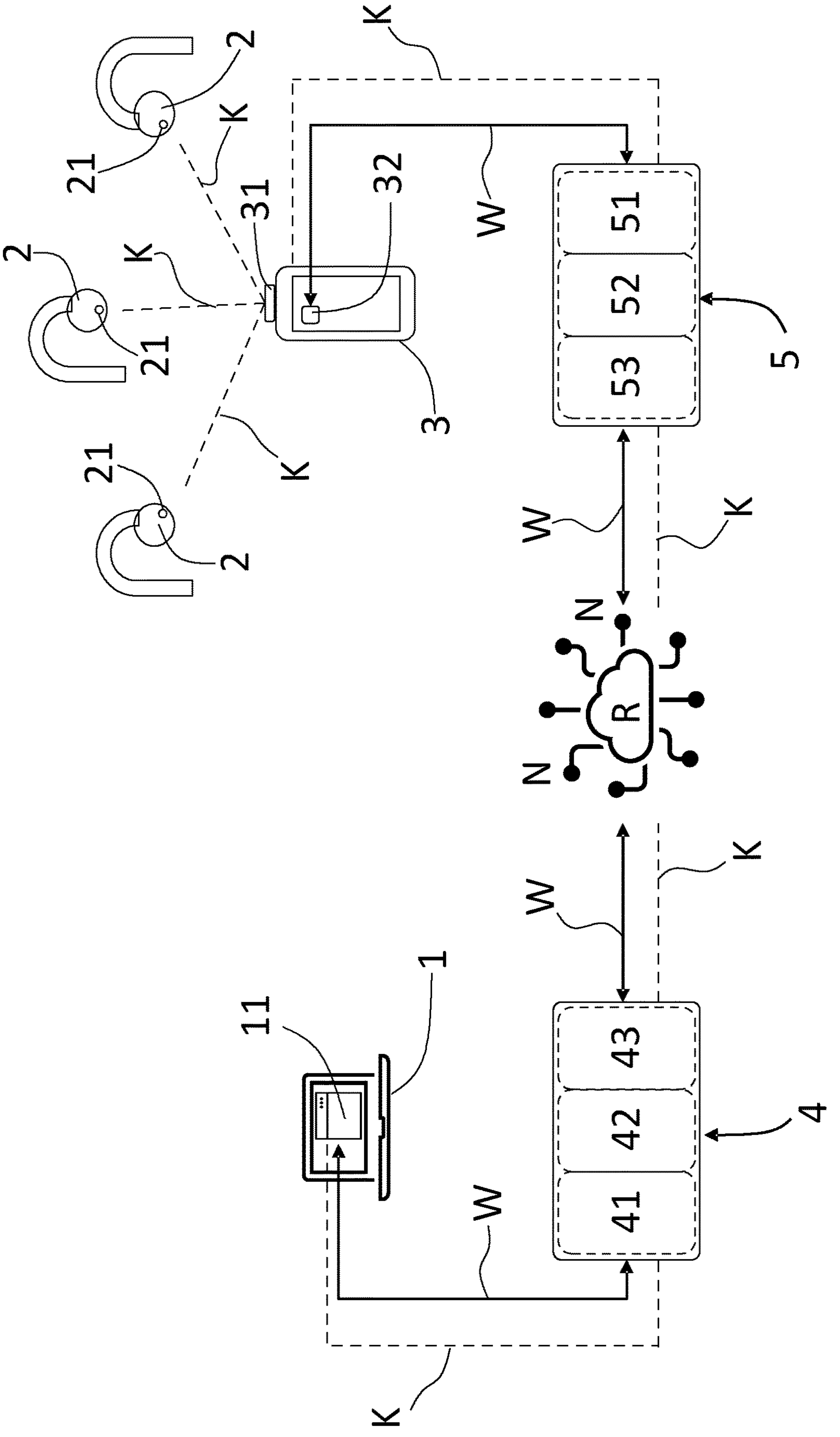

As shown in the example in FIG. 4, the method according to the invention involves providing at least one processing device 1 in the possession of a professional operator, preferably a hearing care professional connectable via a specific communication board, according to techniques of known type, to a multi-node N telecommunication network R, e.g., the Internet network. The processing device 1 may preferably comprise a computer. However, the possibility of the processing device 1 being a different computing device, such as, e.g. a PDA, a smart-phone or other similar devices, cannot be ruled out. The method according to the invention also involves providing at least one wearable appliance 2, preferably a hearing aid 2 which can be worn by a user/ patient with hearing dysfunctions. However, the possibility of the wearable appliance 2 being a different device, such as, e.g., a smart-watch, a smart-glass, earbuds, etc., and/or other similar wearable electronic devices cannot be ruled out.

Usefully, the hearing aid 2 is provided internally with at least one transceiver module 21. The transceiver module 21 is configured to preferably operate in Bluetooth Low Energy (so-called "BLE") wireless technology, e.g., in the ISM radio frequency spectrum, in order to exchange and transmit, as will be seen below, different data with additional devices placed nearby. However, the possibility cannot be ruled out that the transceiver module 21 of the hearing aid 2 also operates on different radio frequencies or different protocols intended, however, to communicate with adjacent devices according to wireless technologies in general such as, e.g., communication of the type of WiFi, BT Classic, NFC, etc.

The method according to the invention also involves providing a portable device 3. Preferably, the portable device 3 is available to the patient but could also be provided by the operator and is also connectable to the telecommunication network R and/or to an additional communication network, e.g., the mobile network. The portable device 3 may preferably comprise a smart-phone. It cannot, however, be ruled out that the portable device 3 may be a different portable device, such as, e.g., a computer, a PDA or other similar devices. The portable device 3 has within it at least one transceiver 31 configured to exchange and transmit data with additional devices placed nearby, preferably according to the Bluetooth protocol. Specifically, the transceiver 31 allows wireless pairing to be established between the portable device 3 and the patient's hearing aid 2. In this context, the transceiver 31 and the transceiver module 21 operate in a mutually compatible frequency range.

Conveniently, the method of the present invention involves the portable device 3 having a specific app 32 installed therein according to techniques that are known in themselves and the operation of which will be explained in detail later on in this description.

In accordance with one embodiment, the computer 1 is provided with a predefined adjusting software 11 (hereafter also referred to as "fitting software") intended for the adjustment, according to techniques known in themselves, of the operating parameters of a hearing aid 2 provided to the patient. As will be seen in detail later on in this detailed description, the adjusting software 11 is intended for the generation of at least one or more adjustment instructions I for the management of the operating parameters of the hearing aid 2 of the portable device 3.

By way of an example, the adjustment instructions I that the adjusting software 11 can generate can be intended for fitting one or more of the following parameters of the hearing aid 2: amplification level, management of compression intervention level, frequency adjustment of audio signals, microphone settings, anti-feedback system management for Larsen attenuation, management of background noise, management of transient and sudden sounds, management of reverberant listening environments, etc.

In accordance with one embodiment, the method of the invention is provided with an architecture provided with a client module 4 and a server module 5. Such modules, via the adjusting software 11, are configured to:

- establish a nonhierarchical connection W between the hearing care professional's computer 1 and the patient's portable device 3,
- send at least one predetermined activation instruction M to the patient's portable device 3 in order to activate the transceiver 31 of the portable device 3,
- establish a logical connection K between the adjusting software 11 and the patient's hearing aid 2,
- send at least one adjustment instruction I to the patient's portable device 3,
- send said at least one adjustment instruction I to the patient's hearing aid 2 via the previously activated logical connection K.

In the remainder of this description and in the subsequent claims, a nonhierarchical connection is defined as a connection which does not involve intermediate servers between two interconnected devices.

Preferably, the non-hierarchical connection W between the hearing care professional's computer 1 and the patient's portable device 3 can be of the wireless type. In a further embodiment, the non-hierarchical connection W between the hearing care professional's computer 1 and the patient's portable device 3 can be of the wired type.

In yet another version, the non-hierarchical connection W is of the peer-to-peer type.

Figure 5:
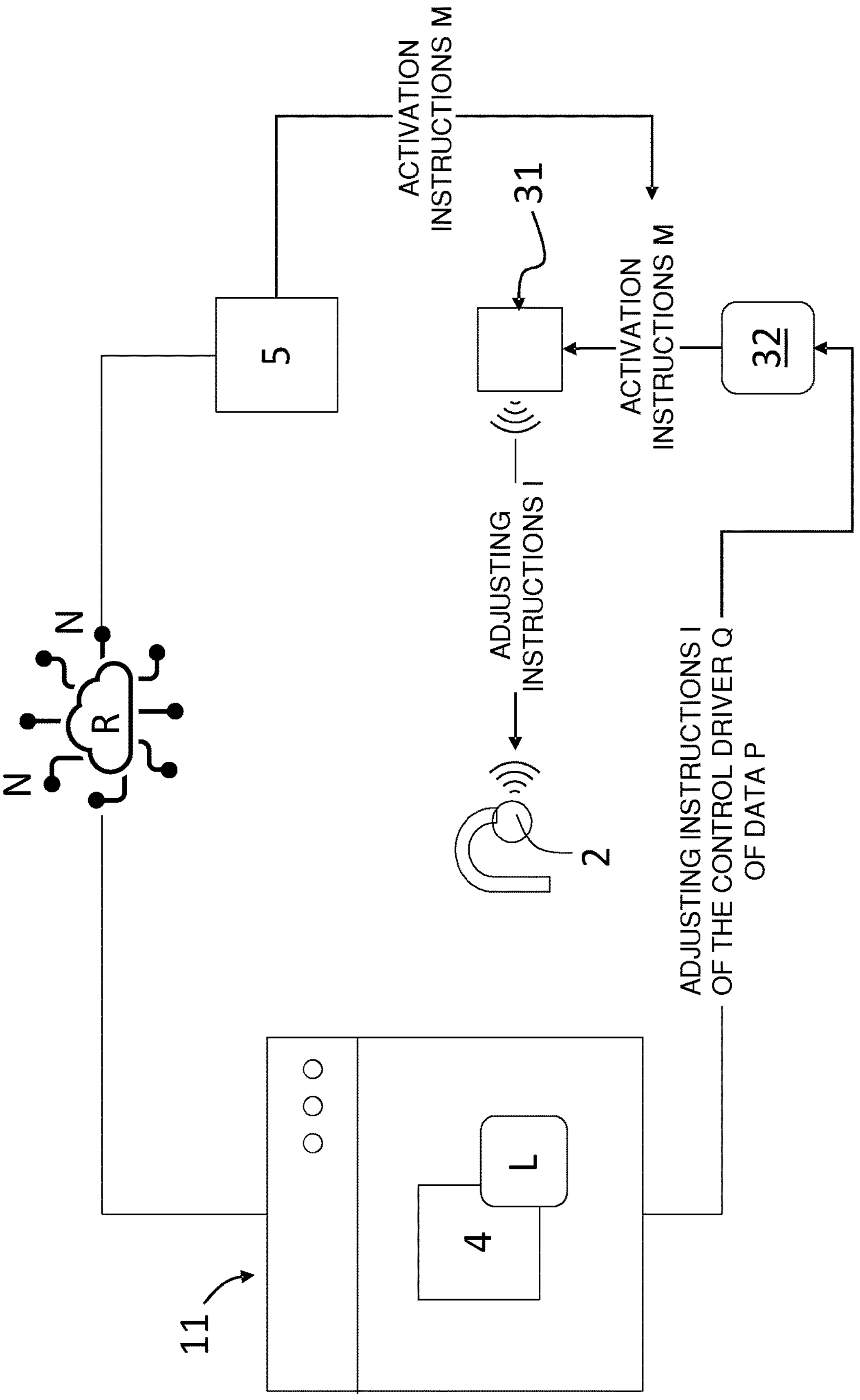
FIG. 5 is a block diagram of the phases intended for direct communication between the adjusting software and the wearable appliance in accordance with the present invention.

For this purpose, as shown in the example in FIG. 5, the client module 4 is implemented into the fitting software 11 installed on the computer 1, the latter being connected to one of the nodes N of the telecommunication network R. In detail, the client module 4 is configured to communicate with the adjusting software 11, the server module 5 and with the portable device 3 and comprises:

- an interfacing block 41,
- a first call block 42, and
- a first network block 43, in signal communication with each other.

On the other hand, the server module 5 is implemented on the app 32 of the portable device 3 also connected to one of the nodes N of the telecommunication network R. In detail, the server module 5 is configured to communicate with the client module 4 and comprises:

- a physical block 51,
- a second call block 52, and
- a second network block 53, in signal communication with each other.

Preferably, the communication between the modules 4 and 5 is based on the use of a peer-to-peer connection W, preferably based on WebRTC technology, in order to achieve a constantly active bilateral communication channel. As will be seen later in this description, the use of such technology is manageable through one or more predefined libraries which allow effective compatibility between the different programming languages carried out by the processing device 1, by the portable device 3 and/or by the hearing aid 2.

Figure 6:
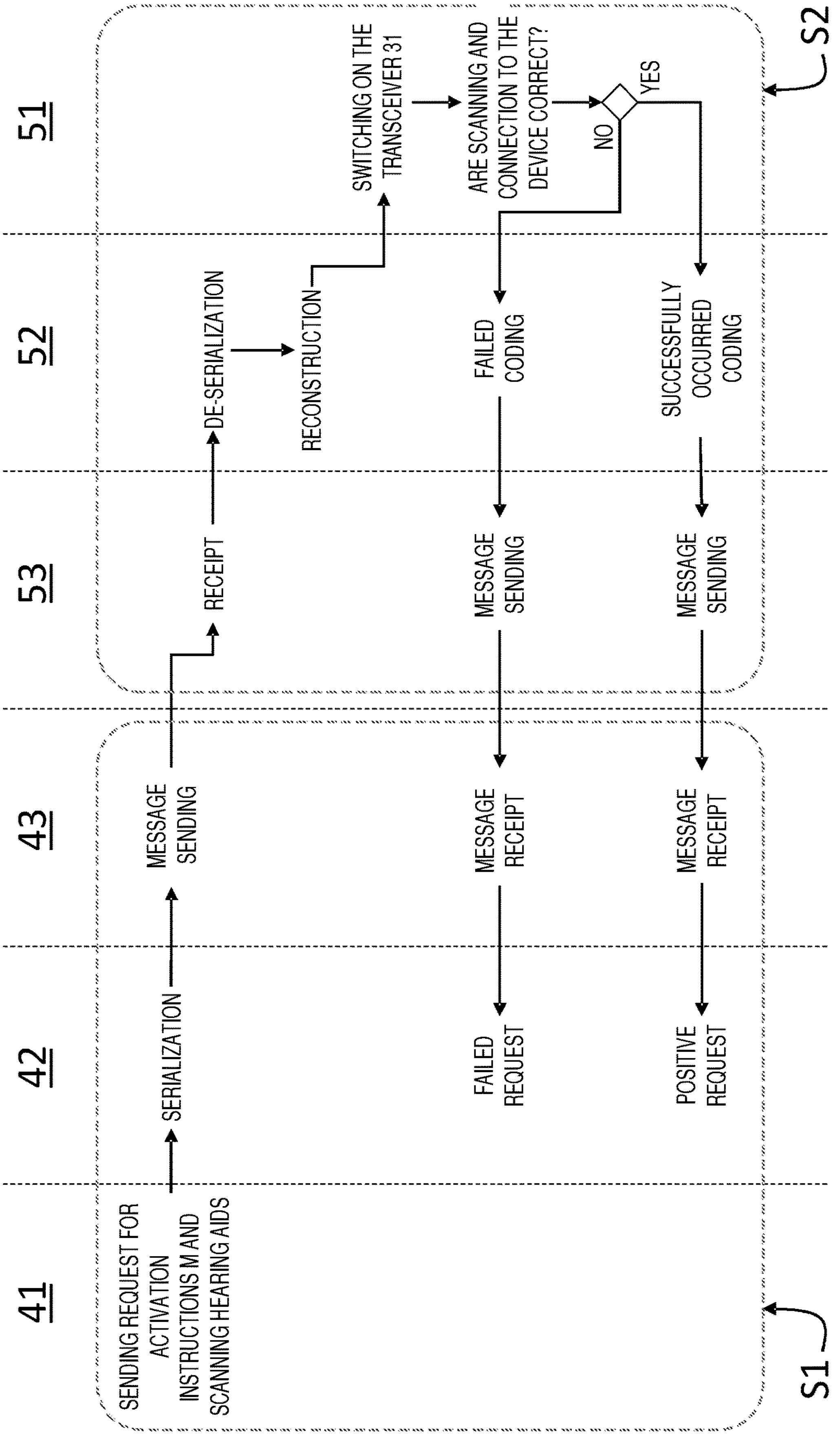

Referring to the example shown in FIGS. 4 and 6, the interfacing block 41 is the main interface of the client module 4 and is intended to control the physical block 51 of the portable device 3: it is a high-level interface available only in the client module 4 and allows a plurality of activation instructions M to be sent to the transceiver 31 to activate/deactivate it.

It should be specified that the compilation of the code that makes up the library L allows the actual generation of the modules 4 and 5.

Preferably, the library L is cross-platform and can be compiled according to techniques known in themselves for any operating system, e.g., Windows, Android, iOS or other systems that support the compiler used.

Advantageously, the library L is also configured to generate predefined control drivers Q which can be picked up and installed in the hearing care professional's processing device 1 following specific authorization and which allow the adjusting software 11 to interact and adapt the data to be exchanged with the hearing aid 2 to the communication protocol made available by the patient's portable device 3.

The first call block 42 and the second call block 52 are shared between the client module 4 and the server module 5 and their function is to send and receive calls to/from adjacent blocks for the subsequent sending/receiving of one or more packets of data P (hereafter also "data P") containing the adjustment instructions I. In detail, such packets of data P are defined by means of programming languages the commands of which have, e.g., the following syntax:

P={"name","parameter","ID","timestamp"} wherein:

"name" identifies the name of the call,

"parameter" identifies the type of parameter intended to be sent such as, e.g., the adjustment instruction I, "ID" uniquely identifies the object field in order to track it within the call modules 42 and 52, "timestamp" identifies a sequence of characters representing the date and/or time to ascertain the actual time when the call occurred.

With reference to the example shown in FIGS. 4 and 6, the first network block 43 and the second network block 53 are responsible for the actual exchange of data P between the client module 4 and the server module 5. For this purpose, there is a phase wherein the call blocks 42, 52 serialize/de-serialize the packets of data P. Specifically, following the call made by the first call block 51, the latter is responsible for serializing the packet of data P into bytes to be sent to the first network block 43. Similarly, once the data packet has been received by the second network block 53, the second call block 52 de-serializes the received bytes back into a packet of data P for later exposure to the physical block 51 of the server module 5.

The network block 43 is substantially responsible for sending the adjustment instructions I while the network block 53 is responsible for receiving the adjustment instructions I.

In accordance with a preferred embodiment, data serialization/de-serialization can be done in a compact format such as the Protobuf format. This format is extremely advantageous compared to traditional serialization formats (e.g., of the JSON type) because it allows reducing the width of bytes required to contain a piece of information exchanged between the modules and, likewise, being able to know the type of information, thanks to the use of the Protobuf format.

The physical block 51 is responsible for the interaction with the internal devices (wired or over-the-air data transmission interfaces) of the portable device 3, particularly with the transceiver 31. It is directly connected to the second call block 52 and is configured to transform the activation instructions M received from the adjusting software 11 and intended to activate the transceiver 31.

In one version, the physical block 51 is configured to generate a control driver Q which allows the adjusting software 11 to interact and adapt the data P to be exchanged with the hearing aid 2 to the communication protocol made available by the patient's portable device 3.

In accordance with one embodiment, the network blocks 43, 53 are responsible for connections, disconnections, sending and receiving data P between the modules 4 and 5. In detail, the method according to the invention involves establishing a non-hierarchical connection W, preferably of the peer-to-peer type, between the processing device 1 and the portable device 3 via one or more nodes N of the network R. Specifically, to establish such a connection W, a signaling server (not shown) is initially arranged between the processing device 1 and the portable device 3. Preferably, the connection W is established via the WebRTC technology, written in a low-level language such as, e.g., C++ or C. Once the connection W has been established between the processing device 1 and the portable device 3, the signaling server can be disconnected, since the packets of data P will be exchanged only from the communication channel opened by WebRTC.

Next, the method according to the invention provides for a logical connection W being established between the processing device 1 and the hearing aid 2, more particularly between the adjusting software 11 and the hearing aid 2. Once the logical connection K has been established, it is possible to send to the wearable appliance 2, via the portable device 3 and by means of the previously activated logical connection, the adjustment instructions I for the adjustment of the operating parameters of the wearable appliance 2 itself. Thus, advantageously, the method of the present invention allows the adjusting software 11 to establish a direct logic channel with the hearing aid 2 as if it were directly connected thereto without intermediation. After reaching the portable device 3, the adjustment instructions I are transmitted to the hearing aid 2 without being further processed since such processing was previously carried out by the client module 4 and by the server module 5.

Preferably, the start of the connection W is based on the Interactive Connectivity Establishment (ICE) technology wherein a shared ID_USER string is defined between the application 32 and the adjusting software 11. Preferably, this string is univocal and allows the connection to a preferable number of three applications, but however, the use of more than three applications cannot be ruled out. In one version, it is possible to have only the adjusting software 11 and the application 32 connected to each other. On the other hand, in a further version, it is possible to have not only the adjusting software 11 and the application 32 connected to each other but also a third application containing a video call module. In the latter case, during an interconnection between the portable device and the processing device it is possible to make one or more video calls to have, e.g., several people participate in the same adjustment activity.

In accordance with a further embodiment, the transmission of data P between the processing device 1 and the portable device 3 is done by exploiting, preferably, the communication protocol SCTP between the modules 4 and 5. The use of different communication protocols such as, e.g., of the QUIC, DCCP type, etc., cannot however be ruled out.

In accordance with a further embodiment, if a peer-to-peer connection W cannot be established between the processing device 1 and the portable device 3, the method of the invention may provide for the use of an additional server (not shown) capable of exposing the public portion of the users' IP addresses to ensure that the connection between the devices 1, 3 is maintained. For example, if one of the devices is connected to the network R via a NAT router, a predefined STUN protocol may be provided in order to maintain the connection via the exposed IP address.

Preferably, the adjustment of the operating parameters of the wearable appliance 2 occurs in real time. Real-time refers to the time elapsed between the request to send the activation instruction M and the receipt of the successful (or failed) request received from the call block 42, as illustrated at the end of the flow in FIG. 6. In this context, the elapsed time, defined as the latency time, has the following values:

latency time (in Wi-Fi) of between 20 ms and 60 ms, preferably about 40 ms;

latency time (in 4G with average signal reception) of between 50 ms and 150 ms, preferably about 100 ms.

In accordance with one embodiment, the packets of data P are encrypted in advance by the blocks 43 and 53. In detail, a phase of encrypting of the packet of data P is provided using a specific tracking protocol (e.g., exploiting WebRTC libraries) intended to ensure the privacy of communications exchanged between the various devices. Preferably, the tracking protocol used is of the DTLS type and enables the prevention of eavesdropping, tampering or falsification of the exchanged data. The DTLS protocol is based on the Transport Layer Security ("TLS") protocol and provides equivalent security guarantees at least equal to the latter.

In accordance with one embodiment, the method of the present invention may provide for the use of an additional software application (not shown) also installed in the device 1 to be able to establish a parallel connection between the processing device 1 and the portable device 3 in order to enable personalized calls and/or video calls with the user. In detail, this additional software application would allow a communication P2P to be established parallel to the main one described above (the STUN protocols outlined above also apply to this connection). In an alternative version, the hearing care professional may open a specific web portal that allows calling the patient on a specific previously installed application of the smart-phone 3.

As appreciated by the present description, it has been ascertained that the invention described herein achieves the intended objects, and in particular the fact is emphasized that through the method described herein it is possible to free oneself from physical bridging devices that are no longer needed by preventing any hardware obsolescence of the devices involved. Additionally, it is possible to distribute a single library usable among all the different manufacturers of hearing aids, thus greatly reducing the effort of maintenance or upgrades in relation to the evolutions of the operating systems over time.

The combination of the characteristics of the method for interconnecting a hearing aid to the adjusting software as well as of the execution thereof are potentially infinite and obviously a technician in the field, in order to meet contingent and specific needs, will be able to make numerous modifications and variations, all of which, however, are contained within the scope of protection of the invention as defined by the following claims.

The invention claimed is:

1. A method for interconnecting and adjusting a wearable appliance (2) to an adjusting software (11) via a communication network (R), comprising the phases of:

providing a processing device (1) available to an operator and comprising the adjusting software (11) for the adjustment of the operating parameters of said wearable appliance (2), providing a portable device (3) having at least one transceiver (31), providing a client module (4) fully integrated into said adjusting software (11) and configured to interface with said telecommunication network (R), and providing a server module (5) configured to communicate with said client module (4) and with said portable device (3) through said telecommunication network (R), establishing a non-hierarchical connection (W) between the processing device (1) of said operator and the portable device (3) by means of said modules (4, 5), sending at least one predetermined activation instruction (M) to the portable device (3) in order to activate said at least one transceiver (31) of the portable device (3), establishing a logical connection (K) between the adjusting software (11) and the wearable appliance (2), sending to the wearable appliance (2), by means of said portable device (3) and by means of the previously activated logical connection (K), at least one predetermined adjustment instruction (I) for adjusting the operating parameters of the wearable appliance (2) itself, wherein said client module (4) comprises:

an interfacing block (41) configured to generate at least one said activation instruction (M), a first call block (42) in signal communication with said interfacing block (41) and configured to generate one or more calls to said network (R), and a first network block (43) in signal communication with said call block (42) configured to query said network (R) in order to establish said connection with said portable device (3), wherein said server module (6) comprises:

a second network block (53) in signal communication with said first network block (43) configured to establish a connection between said processing device (1) and said portable device (3), a second call block (52) in signal communication with said second network block (53) and configured to receive said calls from said first call block (42) and a physical block (51) in signal communication with said second call block (52) and configured to make said activation instructions (M) compatible with a specific language of an operating system installed in said portable device (3), the method also comprising the phases of:

providing a predefined software library (L) shared between said client module (4) and said server module (5), generating, by means of said physical block (51), at least one control driver (Q) in order to allow the adjusting software (11) to adapt said adjustment instruction (I) to the communication protocol made available by the portable device (3).

2. The method according to claim 1, wherein said phases are carried out in chronological order.

3. The method according to claim 2, wherein said phase of establishing the non-hierarchical connection (W) comprises the use of the non-hierarchical connection of a peer-to-peer type.

4. The method according to claim 1, wherein said phase of establishing a logical connection (K) comprises the phase of establishing a wireless connection between the portable device (3) and the wearable appliance (2) via a communication protocol of a Wi-Fi, BLE, BT Classic or NFC type.

5. The method according to claim 4, wherein said adjusting software (11) is configured to send said adjustment instruction (I) to said wearable appliance (2) to adjust the operating parameters thereof.

6. The method according to claim 1, comprising the phases of:

serializing said instructions (I, M) to be sent to said server module (5) as a result of the call performed by said first call block (42) and, sending said instructions (I, M) via said first network block (43) to said second network block (53).

7. The method according to claim 6, wherein serializing said instructions (I, M) comprises serializing packets of data (P) using a compact serialization format.

8. The method according to claim 7, wherein said compact serialization format reduces a number of bytes required to contain information exchanged between said client module (4), said server module (5), said processing device (1), and said portable device (3).

9. The method according to claim 1, comprising the phases of:

receiving said instructions (I, M) via the second network block (53), and deserializing said instructions (I, M) received from said client module (4).

10. The methed according to claim 1, wherein the adjustment of the operating parameters of the wearable appliance (2) is comprised between 20 ms and 60 ms, preferably about 40 ms, in the case of a Wi-fi connection, and between 50 ms and 150 ms, preferably about 100 ms, in the case of a 4G connection.

11. The method according to claim 1, wherein establishing said non-hierarchical connection (W) comprises using a signaling server arranged between said processing device (1) and said portable device (3).

12. The method according to claim 11, wherein, once said non-hierarchical connection (W) has been established, said signaling server is disconnected and packets of data (P) are exchanged only through a communication channel of said non-hierarchical connection (W).

* * * * *